US006769353B1

(12) United States Patent
Smith et al.

(10) Patent No.: US 6,769,353 B1
(45) Date of Patent: Aug. 3, 2004

(54) FOUR TWINE TUBE ROUND BALER TWINE SYSTEM

(75) Inventors: Kevin Smith, Narvon, PA (US); Edward H. Priepke, Lancaster, PA (US)

(73) Assignee: New Holland North America, Inc., New Holland, PA (US)

( * ) Notice: Subject to any disclaimer, the term of this patent is extended or adjusted under 35 U.S.C. 154(b) by 16 days.

(21) Appl. No.: 10/375,022

(22) Filed: Feb. 28, 2003

(51) Int. Cl.[7] .......................... B65B 13/18; A01D 39/00
(52) U.S. Cl. ............................... 100/5; 100/13; 100/88; 56/341
(58) Field of Search ................... 100/5, 13, 88, 100/89; 56/341, 343; 53/118, 507, 587

(56) References Cited

U.S. PATENT DOCUMENTS

| | | |
|---|---|---|
| 2,968,233 A | 1/1961 | Bolton |
| 2,971,455 A | 2/1961 | Wade et al. |
| 3,869,849 A | 3/1975 | Ulrich |
| 4,150,614 A | 4/1979 | Schwartz |
| 4,174,661 A | 11/1979 | Mathes et al. |
| 4,182,235 A | 1/1980 | Harig |
| 4,282,804 A | 8/1981 | Cools |
| 4,446,783 A | 5/1984 | Illy |
| 4,793,249 A | 12/1988 | Wellman |
| 4,796,524 A | 1/1989 | Renaud |
| 5,072,667 A | 12/1991 | Yeardley |
| 5,168,685 A | 12/1992 | Suzuki |
| 5,184,545 A * | 2/1993 | Jennings et al. ............ 100/5 |
| 5,349,806 A | 9/1994 | Swearingen et al. |
| 5,388,504 A | 2/1995 | Kluver |
| 5,447,009 A | 9/1995 | Oleksy et al. |
| 5,595,055 A | 1/1997 | Horchler, Jr. et al. |
| 6,164,050 A | 12/2000 | Vande Ryse et al. |
| 6,209,450 B1 | 4/2001 | Naaktgeboren et al. |

* cited by examiner

Primary Examiner—Allen Ostrager
Assistant Examiner—Jimmy Nguyen
(74) Attorney, Agent, or Firm—John William Stader; Collin A. Webb

(57) ABSTRACT

A round baler including a housing; a bale chamber; bale forming apparatus; and bale wrapping apparatus including: four twine supply rolls defining four twine strands; four twine dispensing tubes, each tube presenting one of the strands so that each strand dangles from the corresponding tube, each tube movable between home and twine insert positions, wherein each strand dangles adjacent to a bale rotating in the chamber when the tubes are in the insert position; and two twine tensioning members disposed so that each tensioning member receives two strands, wherein each tensioning member has a receiving portion through which two strands are threaded, wherein each tensioning member is positioned to provide slack tension on two respective strands when the tubes are in the insert position, and wherein each tensioning member is positioned to increase wrapping tension on the two strands after the two respective strands have started to wrap the bale.

13 Claims, 5 Drawing Sheets

FOUR TWINE TUBE ROUND BALER TWINE SYSTEM

FIELD OF THE INVENTION

The present invention relates generally to agricultural round balers for forming round bales of cut crop material and twine wrapping systems that automatically wrap the formed bales with twine before expelling them onto a field for subsequent handling. More particularly, the invention relates to improvements in the bale wrapping system by providing four twine dispensing arms that result in a decrease in the amount of time it takes to wrap a formed bale with twine.

BACKGROUND OF THE INVENTION

Typical round balers (also referred to simply as a "baler"), such as disclosed in U.S. Pat. No. 6,209,450 to Naaktgeboren et al., are agricultural machines that pick up a cut crop material from the ground and form it into a compacted round bale in a bale forming chamber. When the bale has been sufficiently compacted to a desired density or a desired size depending on the baler construction, bale density or bale size sensors, as appropriate, send signals to a controller that subsequently sends a signal to an operator's panel to stop forward motion of the baler so that a bale wrapping operation can be performed, wherein the formed bale is wrapped with netting or twine to produce a completed wrapped bale.

Typically, the wrapping operation is performed by a bale wrapping mechanism controlled by a bale wrapping algorithm preprogrammed into a controller (i.e., microprocessor) that is part of the baler. In the prior art baler of the present assignee, the bale wrapping mechanism has two twine wrapping tubes/arms, wherein each tube/arm dispenses a single strand of twine. When a wrap cycle is initiated, the twine tubes/arms are moved arcuately to an extended or insert position with an end of each respective twine strand dangling from the end of the corresponding twine tube/arm; optionally, a pusher mechanism, often referred to as a "duckbill," is actuated to move the dangling twine ends toward the formed bale so that the ends of the twine strands are adjacent to the bale near its lengthwise middle. Subsequently, the dangling strands are caught by the cut crop material of the rotating bale as it rotates in the bale forming chamber so that the twine is pulled from the twine tubes/arms and wraps around the bale as the bale continues to rotate. As twine is pulled from the twine tubes/arms and wraps about the rotating bale, the twine tubes/arms are moved from the middle to the ends of the bale so that twine wraps all along the length of the bale. At the end of a wrap cycle, a tying operation is performed as is generally known. Before the completed wrapped bale is expelled from the baler, the twine strands must be cut, then the baler tailgate opens and the completed wrapped bale is expelled from the baler to the ground.

However, there are two problems with the assignee's prior bale wrapping apparatus having two twine tubes/arms. First, during the wrapping operation, each twine tube/arm is moved across a portion of the width of the rotating surface of the bale in a prescribed fashion to control the position of the twine on the bale to provide a secure wrap, then at least two wraps are required with the tubes/arms stationary at the beginning and the end of the wrapping cycle in order to effectively tie the bale securely. The problem with this system is that it takes an excessive amount of time to wrap a bale. Second, when applying twine to the bale, the two twine tubes/arms move to a starting position to insert twine into the bale forming chamber, then the tubes/arms gradually move back to a home position to finish wrapping the bale. As twine is applied to the bale, tension must be applied to the twine to ensure that the bale is tied securely. While twine tension helps in securing the bale, it is detrimental to starting the twine wrapping cycle. For this reason, it would be advantageous to have a mechanism that places low tension on the twine as it starts to wrap on the bale, then increases tension on the twine after the twine has started wrapping about the bale.

The present invention endeavors to provide a round baler with an improved bale wrapping apparatus with four twine tubes on two twine dispensing arms to facilitate the rapid wrapping of a formed bale. Furthermore, the present invention will provide structure that provides low tension in the twine at the beginning of a wrap cycle and that provides greater tension in the twine once the wrap cycle had progressed.

Accordingly, one object of the present invention is to overcome the disadvantages of the assignee's prior bale wrapping apparatuses having two twine tubes/arms (i.e., one twine tube per arm).

Another object of the present invention is to provide a bale wrapping apparatus that achieves the wrapping and tying of a formed bale in less time than the prior devices, thereby shortening the time to complete a bale wrapping cycle by 40–50%.

Another object of the present invention is to provide a bale wrapping apparatus that automatically adjusts the tension in the twine so that there is low tension in the twine at the beginning of a wrap cycle and higher tension in the twine after the beginning of a wrap cycle.

Another object of the present invention is to provide a bale wrapping apparatus that keeps four twine strands more evenly spaced across the surface of a bale during a bale wrapping operation.

Another object of the present invention is to provide a bale wrapping apparatus that is practical and cost effective to manufacture.

Another object of the present invention is to provide a bale wrapping apparatus that is both durable and reliable, and easy to maintain.

SUMMARY OF THE INVENTION

In accordance with the above objectives, a first preferred embodiment of the present invention provides a round baler comprising: (a) a housing; (b) a bale chamber defined in part by walls of the housing and having an opening for receiving a cut crop material; (c) a bale forming apparatus defining at least a portion of the bale chamber, configured to form a rotating bale of cut crop material in the chamber, and disposed inside the housing; (d) a bale wrapping apparatus disposed near the bale chamber to wrap a rotating bale formed in the chamber: (e) four twine supply rolls rotatingly connected to the housing and defining four twine strands; (f) four twine dispensing tubes, wherein each dispensing tube presents a corresponding one of the four twine strands so that an end of each strand dangles from the corresponding tube, each tube being movable between (1) a home position and (2) a twine insert position, wherein each twine strand end dangles adjacent to a position of a bale rotating in the chamber when the four dispensing tubes are in the twine insert position; and (g) two twine tensioning members disposed so that each twine tensioning member receives two of the four twine strands, wherein each twine tensioning member has a receiving portion through which the two strands are threaded, wherein each twine tensioning member is positioned to provide slack tension on the ends of the respective two strands when the four dispensing tubes are in the twine insert position, and wherein each twine tensioning member is positioned to increase wrapping tension on the respective two strands after the respective two strands have started to wrap the rotating bale.

In accordance with a second preferred embodiment of the present invention, the first preferred embodiment is further modified so that each twine tensioning member has two holes formed therein to provide the receiving portion and wherein each hole receives threaded therethrough one of the respective two strands.

In accordance with a third preferred embodiment of the present invention, the first preferred embodiment is further modified so that each twine dispensing tube is provided by a tube or a ring through which a respective one of the four strands is threaded therethrough.

In accordance with a fourth preferred embodiment of the present invention, the first preferred embodiment is further modified so that each twine dispensing tube is movable along an arcuate path between the home position and the twine insert position.

In accordance with a fifth preferred embodiment of the present invention, the first preferred embodiment is further modified so that the bale wrapping apparatus further comprises two arm members, each arm member being connected to a respective two of the four twine dispensing tubes.

In accordance with a sixth preferred embodiment of the present invention, the first preferred embodiment is further modified so that each arm member includes two hollow portions through which a respective one of the four twine strands passes.

In accordance with a seventh preferred embodiment of the present invention, the fifth preferred embodiment is further modified so that the bale wrapping apparatus further comprises a twine arm pivotally connected at one end to a cam member connected to each arm member and pivotally connected at the other end to a base mount.

In accordance with an eighth preferred embodiment of the present invention, the seventh preferred embodiment is further modified so that each twine tensioning member is provided by a portion of the base mount.

In accordance with a ninth preferred embodiment of the present invention, the seventh preferred embodiment is further modified so that each twine arm is provided by two link members, each link member being pivotally connected at one end to a respective cam member and pivotally connected at the other end to the base mount.

In accordance with a tenth preferred embodiment of the present invention, the ninth preferred embodiment is further modified so that each link member has a hollow portion and one of the four twine strands is threaded through the hollow portion of each link member.

In accordance with an eleventh preferred embodiment of the present invention, the first preferred embodiment is further modified so that each twine dispensing tube is movable to a cutting position, and wherein each twine tensioning member provides additional tension to each of the respective two strands when the four twine dispensing tubes are in the cutting position.

Further objects, features and advantages of the present invention will become apparent from the Detailed Description of Preferred Embodiments, which follows, when considered together with the attached drawings.

DETAILED DESCRIPTION OF THE PREFERRED EMBODIMENTS

Figure 1:
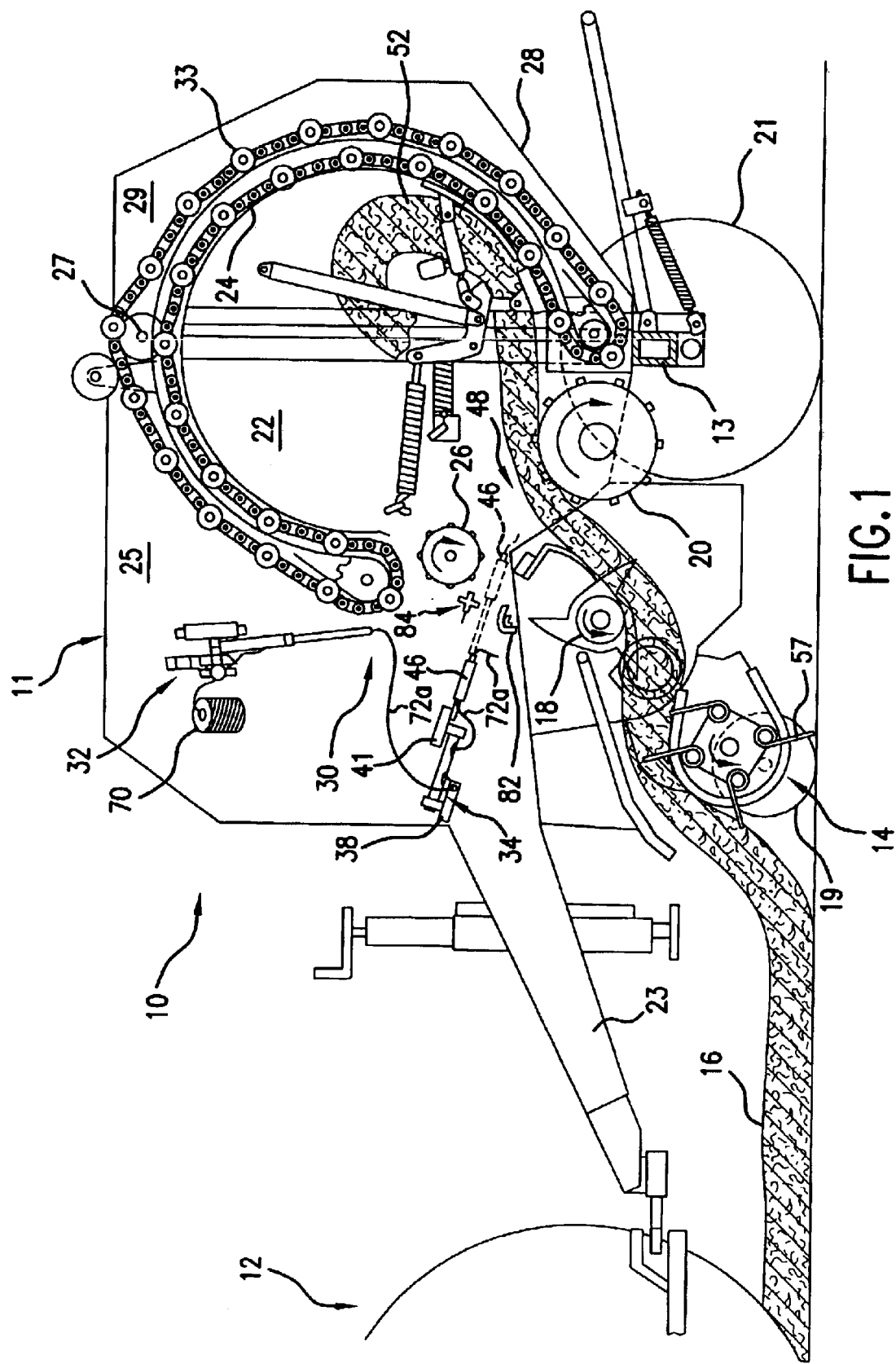
FIG. 1 is a cutaway side elevational view of a round baler in accordance with the present invention.

The preferred embodiments of the invention will now be described with reference to the Figures in which like parts are indicated by like reference numerals. The apparatus of the present invention as shown in FIG. 1 is a round baler 10 including a main frame or housing 11 and a bale forming chamber 22 formed inside of housing/frame 11, wherein the bale forming chamber is illustrated as a fixed bale forming chamber for forming a geometrical package out of cut crop material 16. The geometrical package of cut crop material formed in the bale forming chamber 22 is known as a "bale." The bale is formed by a chain conveyer 24, also referred to as an "apron," that surrounds and defines a portion of the chamber 22. Apron 24 serves to rotate the cut crop material in the bale forming chamber 22 by using slats 33 of the apron 24 that engage and rotate the cut crop material, thereby moving the cut crop material about the bale forming chamber 22 to form the bale 52 as described in U.S. Pat. No. 6,164,050, which is incorporated herein by reference in its entirety. Preferably, the bale produced in the bale forming chamber 22 has a cylindrical shape; however, one skilled in the art would appreciate that the present invention can be practiced on balers that produce other bale shapes and can be practiced by round balers having a variable bale forming chamber.

Main frame 11 includes a main support beam 13 on which a pair of wheels 21 (only one shown) is rotatably affixed. A tongue 23 extends from a front portion of frame 11 to provide a conventional hitch connection for connecting to a tractor 12 or other work vehicle. Frame 11 also includes a pair of sidewalls 25 (only one shown) between which the bale forming chamber 22 extends. A pair of stub shafts 27 (only one shown) pivotally connect tailgate 28 to main frame 11. Tailgate 28 pivotally rotates about the stub shafts 27 from the closed position shown in FIG. 1 to an open position as is conventionally known so that a completed wrapped bale can be discharged to the ground for subsequent handling. Tailgate 28 includes a pair of tailgate sidewalls 29 (only one shown) that are coextensive with sidewalls 25.

Baler 10 includes a pick-up assembly 14 for picking up a cut crop material 16, such as straw, hay, and the like, from a field and delivering it to a moving conveyer 18, which feeds the cut crop material into the bale forming chamber 22 while the baler moves across a field. Although FIG. 1 illustrates conveyer 18 as a feeder rotor, one skilled in the art would recognize that a stuffer mechanism, such as disclosed in U.S. Pat. No. 5,595,055 to Horchler, Jr., et al., which is incorporated herein by reference in its entirety, could be used in place of the feeder rotor without departing from the scope of the present invention. The pickup assembly 14 has tines 57 and a pair of wheels 19 (only one shown), and operates in a known manner.

The bale forming chamber 22 is defined by the coextensive sidewalls 25 and 29, apron 24, rotating floor roll 20, and rotating stripper roll 26. A rotating bale 52 is formed within the bale forming chamber 22 when cut crop material is fed into the chamber by the pickup assembly 14 as is known. When the bale 52 reaches a predetermined size such as occurs in variable size chambers, or in the alternative when the bale 52 reaches a predetermined density such as occurs in fixed size chambers, appropriate size or density sensors respectively indicate that the bale is ready to be wrapped. Subsequently, the baler 10 stops its forward motion while a bale wrapping operation is performed by a bale wrapping assembly 30.

Bale wrapping assembly 30 is disposed within housing/frame 11 so as to be adjacent to the bale forming chamber 22 and serves to wrap wrapping material, such as net, twine or plastic sheet, around the bale 52 formed within the bale forming chamber. The bale wrapping assembly 30 illustrated in FIG. 1 includes a twine wrapping apparatus 32 and may optionally include a net wrapping apparatus (not shown) as is, for example, disclosed in U.S. Pat. No. 6,209,450. The twine wrapping apparatus 32 dispenses four twine strands 72a, 72b, 72c, 72d as shown in FIGS. 1–4 that are stored on at least four twine balls 70 (only one shown), and the net wrapping apparatus dispenses netting or plastic sheets that is stored on a roll. When the bale 52 is completely formed, the operator of the baler 10 operates the bale wrapping assembly to dispense either twine or netting/plastic sheeting in a known manner. Balers that have a bale wrapping assembly that includes only a twine wrapping apparatus 32 will only dispense twine.

Figure 2:
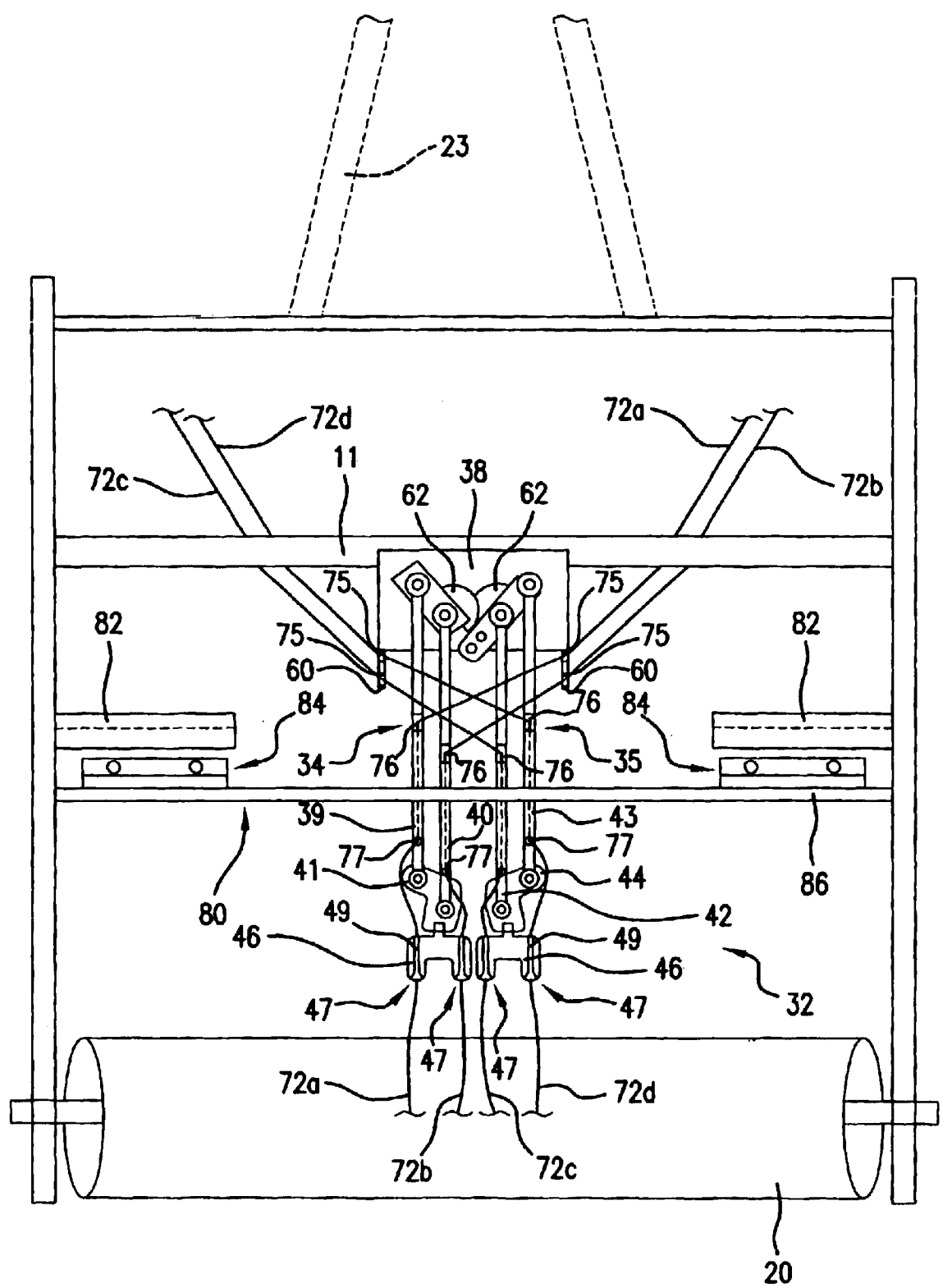
FIG. 2 schematically illustrates a plan view of the twine wrapping apparatus and the twine cutting mechanism with the twine arms in the first position.
Figure 3:
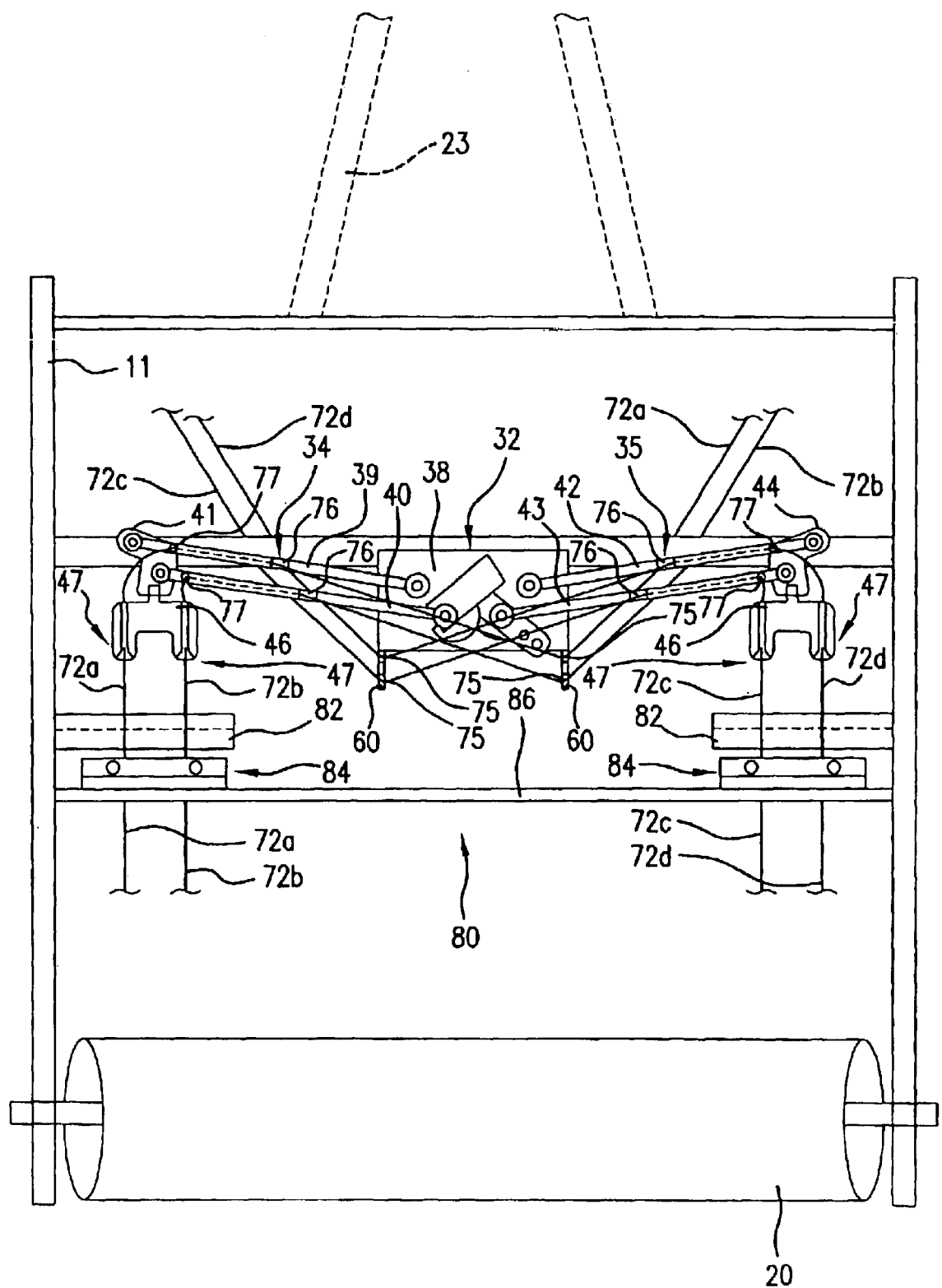
FIG. 3 schematically illustrates a plan view of the twine wrapping apparatus and the twine cutting mechanism with the twine arms in the cutting position.
Figure 4:
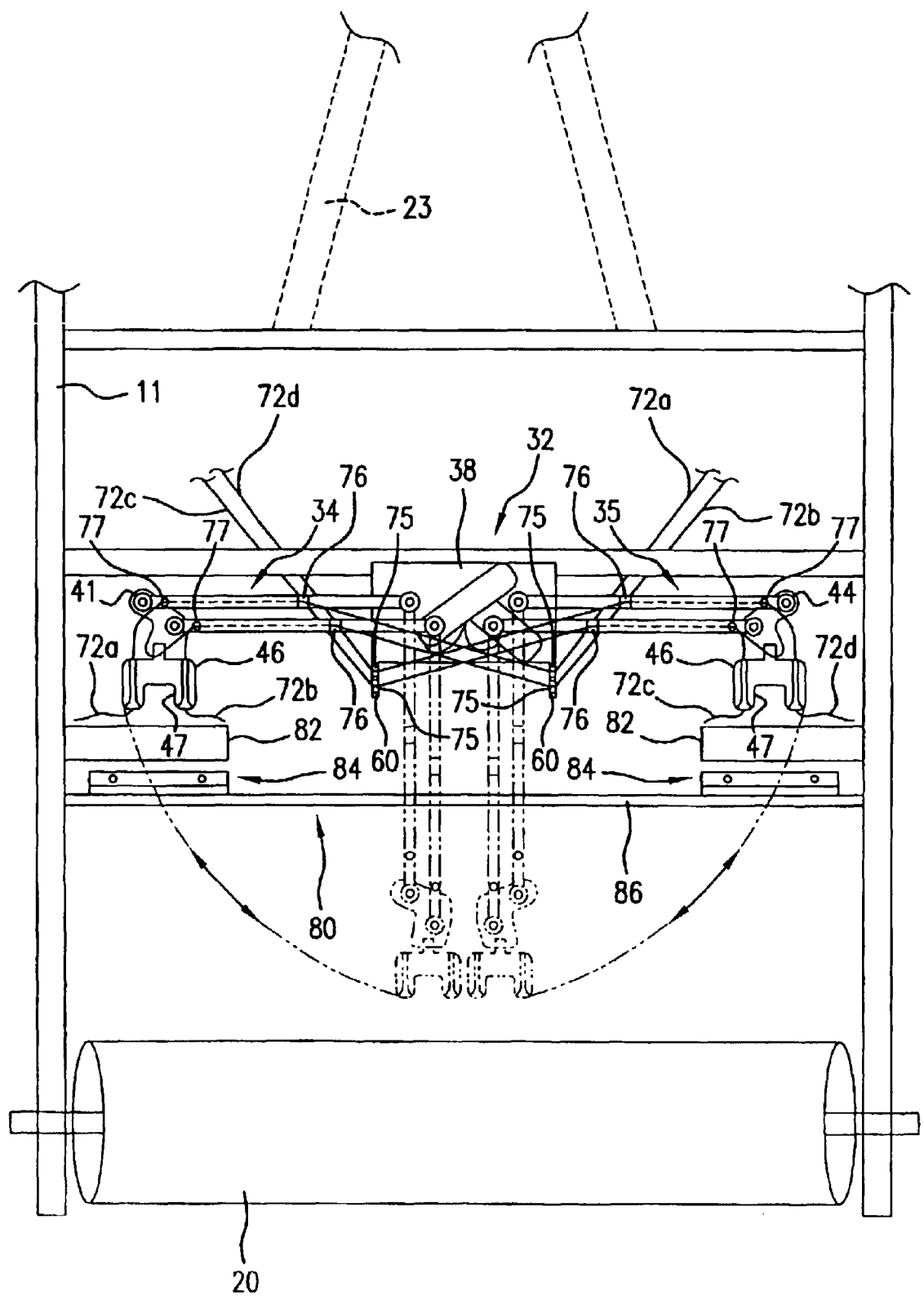
FIG. 4 schematically illustrates a plan view of the twine wrapping apparatus and the twine cutting mechanism with the twine arms in the home position.

Twine wrapping apparatus 32 includes two pivotally mounted twine dispensing arms 34 and 35 upon which are mounted two twine tubes 47 each. As shown in FIGS. 2, 3 and 4, the twine wrapping apparatus 32 has a base mount 38 connected to frame 11. Twine arms 34 and 35 are pivotally mounted on base mount 38 so that each twine arm can pivot between a "first position" (also referred to as the "twine insert position") shown in FIG. 2 at the start of a twine wrapping cycle as will be described later to a "cutting position" as shown in FIG. 3. Between twine wrapping cycles, the twine arms 34, 35 are stored in a "home position" as shown in FIG. 4. Twine arms 34, 35 are driven to move by a twine wrap actuator (not shown), which is powered by a twine wrap actuator drive motor such as disclosed in U.S. Pat. No. 6,209,450 B1 to Naaktgeboren et al, incorporated herein by reference in its entirety. Gears 62 transmit power from the twine wrap actuator to pivot the twine arms 34, 35 in a controlled manner such as would be directed by an on board computer or microprocessor.

Twine arm 34 includes two link members 39, 40 that are pivotally connected at one end to the base mount 38 and pivotally connected at another end to cam member 41. Twine arm 35 includes two link members 42, 43 that are pivotally connected at one end to base mount 38 and pivotally connected at another end to cam member 44. Each cam member 41 and 44 is connected to an arm member 46 that has two twine tubes 47 for dispensing one twine strand each. Thus, each twine arm 34, 35 in accordance with the present invention includes two individual twine arms 47 connected in pairs, wherein each twine arm dispenses a single strand of twine. A parallel linkage ensures that the four twine tubes 47 are always maintained perpendicular to the cylinder axis of the cylindrical bale 52 as evident from FIGS. 2–5. The parallel linkage is formed by link members 39, 40, 42, 43 and the cam members 41, 42 so that the two twine arms 34 and 35 connected to the base mount 38 provide this parallel linkage that keeps respectively paired twine dispensing tubes 47 evenly spaced and perpendicular to a bale axis BA (see FIG. 5) as the twine arms move across a surface of the bale during a twine wrapping operation. One skilled in the art would appreciate from FIG. 5 that bale axis BA is the cylindrical axis about which cylindrical bale 52 rotates once the bale is formed. Consequently, the twine in each twine tube pair remains evenly spaced across the surface of the bale during the twine wrapping operation. The result of these features is that the twine wrapping apparatus keeps all four twine strands properly and more evenly spaced across the surface of the bale during the twine wrapping operation.

Baler 10 is provided with four twine balls 70 (only one shown) and each twine ball provides one of the twine strands 72a, 72b, 72c, and 72d. Each twine strand 72a, 72b, 72c, and 72d is threaded through a respective hole 75 in a twine tensioning member 60 of the base mount 38 and through a respective one of the link members 39, 40, 42, 43 because each link member 39, 40, 42, 43 is a hollow tube with openings 76, 77 through which a twine strand may pass. Arm members 46 include two tubular hollow portions 49 through which a twine strand may pass. Each twine tube 47 is preferably a hollow tube that is contiguous with one of the tubular hollow portions 49 of the arm members 46 so that a twine strand may pass through a respective contiguous hollow tube portion 49 and corresponding twine tube 47. Alternately, hollow portions 49 could be grooves or indentations in arm members 46 and each twine tube 47 is a hollow tube or ring that is constructed to be contiguous with the hollow portions 49, or to be not contiguous with the hollow portions 49. In one preferred embodiment of the invention, each arm member 46 includes two twine tubes 47 as described above but the hollow portions 49 have been omitted.

During baler operation, the formation of a bale 52 is achieved in the conventional manner while baler 10 moves along a field of cut crop material picking up the cut crop material with pick-up assembly 14, and delivers the cut crop material using conveyer 18 to move the cut crop material through bale chamber inlet 48 defined by floor roll 20 and stripper roll 26. When the bale 52 has reached a certain size or density, depending upon whether baler 10 is a variable chamber baler or a fixed chamber baler, size or density sensors (as appropriate) are activated and signal the operator or an on board computer that the bale 52 is ready for the bale wrapping operation. Upon initiation of the bale wrapping operation, the twine arms 34, 35 move from the home position shown in FIG. 4 to the first position shown in FIGS. 2 and 5 (see also phantom lines in FIG. 4). In the first position, the ends of twine strands 72a, 72b, 72c, and 72d dangle into inlet 48 where they get caught and carried by the rotating bale 52. In this manner, the twine strands 72a, 72b, 72c, and 72d wrap around bale 52 and secure the cut crop material as the bale rotates. During a predetermined sufficient number of wrappings, twine arms 34, 35 pivot from the first position back to the cutting position shown in FIG. 3 so that twine is wrapped around both the center and the peripheral portions of bale 52. When the twine arms 34, 35 reach the cutting position, there is tension in each of the twine strands 72a, 72b, 72c, and 72d and a cutting procedure takes place to cut each of the twine strands 72a, 72b, 72c, and 72d simultaneously. The bale wrapping operation concludes with the cutting of the twine strands, then the twine arms 34, 35 return to the home position, and the completed wrapped bale is discharged to the ground when tailgate 28 opens.

The present invention, being a four twine tube round baler twine system, provides four twine strands 72a, 72b, 72c, and 72d simultaneously for wrapping the bale 52, which decreases the number of revolutions the bale must undergo before completing the bale wrapping cycle. Decreasing the number of bale revolutions required during the bale wrapping cycle plainly decreases the amount of time needed to complete the wrapping cycle. However, the twine wrapping apparatus 32 also provides automatic adjustment of the tension in the twine strands 72a, 72b, 72c, and 72d during the bale wrapping operation so that there is low tension in the ends of twine strands 72a, 72b, 72c, and 72d at the beginning of the wrap cycle and a higher tension in the twine after the beginning of the wrap cycle. As shown in FIG. 4, the ends of twine strands 72a, 72b, 72c, and 72d are dangling from twine tubes 47 and have no tension on them when the twine arms 34, 35 are in the home position. Likewise, the remainder of each twine strand 72a, 72b, 72c, and 72d has a relatively low tension therein when the twine arms 34, 35 are in the home position.

Figure 5:
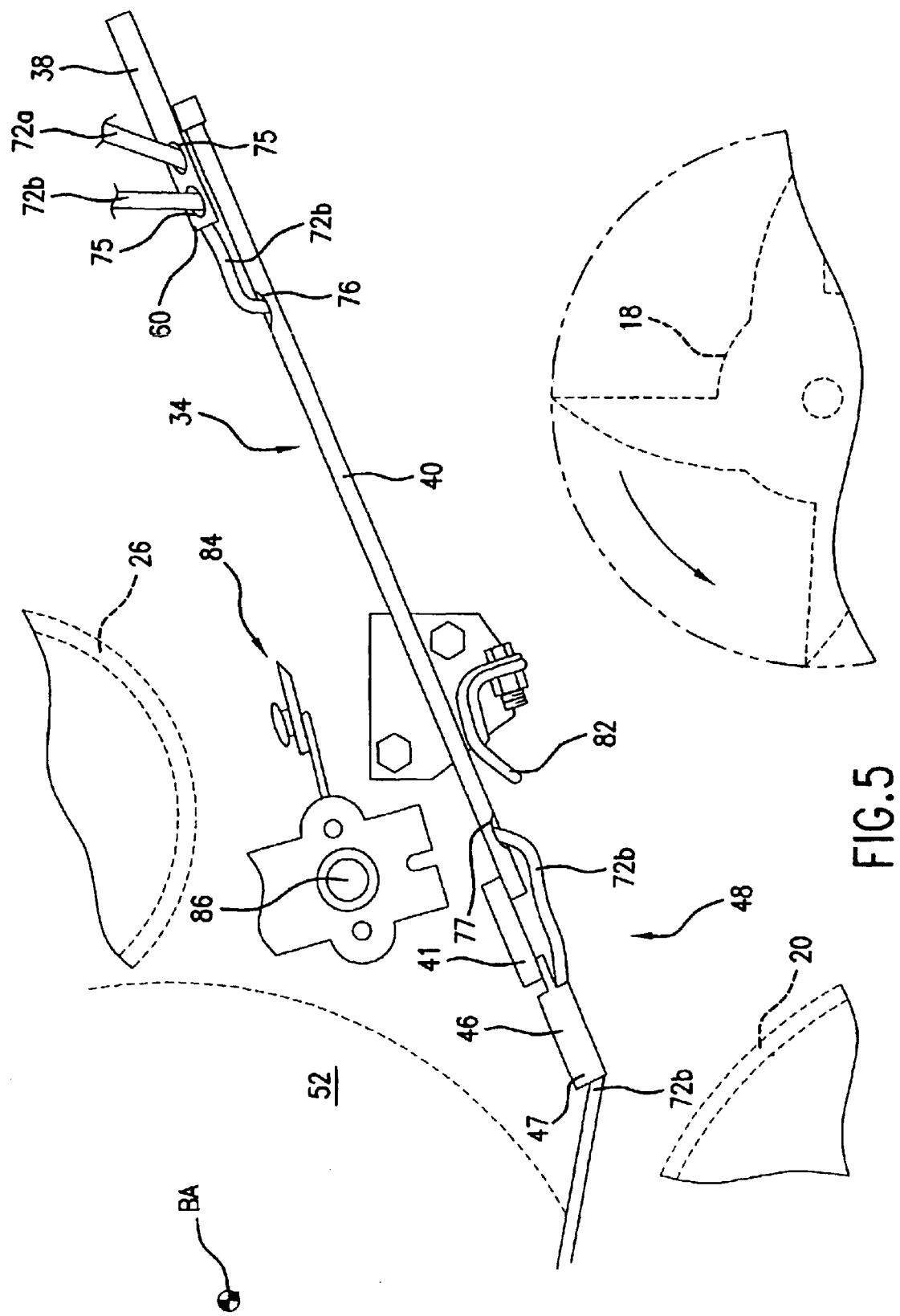
FIG. 5 schematically illustrates the increased tension in one of the twine strands exerted by the rotating bale when the twine arms are in the first position.

FIG. 2 shows the twine strands 72a, 72b, 72c, and 72d with the twine arms 34, 35 in the first position just as each twine strand is being caught by the rotating bale. For the initial moments when the twine arms 34, 35 are in the first position, the end of each twine strand 72a, 72b, 72c, and 72d is dangling and experiences no significant tension (also referred to as "slack tension"). Consequently, the remainder of each twine strand 72a, 72b, 72c, and 72d has a relatively low tension, or slack tension, therein when the twine arms 34, 35 initially reach the first position. However, as the end of each twine strand 72a, 72b, 72c, and 72d is caught and carried by the periphery of the rotating bale 52, each twine strand experiences more tension. FIG. 5 demonstrates this increased tension in the twine as the periphery of bale 52 catches the twine. For simplicity's sake, only twine arm 34 and twine strand 72b are illustrated. As shown by comparing FIGS. 2, 4 and 5, it is clear that twine strands 72a, 72b, 72c, and 72d experience low tension at the beginning of a twine wrapping cycle (i.e., twine arms 34, 35 have just arrived in the first position) and then experience a higher amount of tension when the periphery of the rotating bale 52 catches and pulls each strand after the beginning of the twine wrapping cycle. The automatic increase in the tension in the twine strands 72a, 72b, 72c, and 72d is provided by the friction that occurs in the system due to the twine configuration shown in FIGS. 2–4 and due to the friction in the two holes 75 of each twine tensioning member 60. Although twine tensioning members 60 have been shown to have two holes 75 for receiving two of the twine strands 72a, 72b, 72c, and 72d, each twine tensioning member could be constructed with some other suitable receiving portion such as a groove without departing from the scope of the present invention.

FIG. 3 shows the twine arms 34 and 35 located in a maximally retracted position, being the cutting position, which generates additional tension in each twine strand 72a, 72b, 72c, and 72d at the end of the wrapping cycle. The twine configuration shown in FIG. 3, wherein each twine strand 72a, 72b, 72c, and 72d, respectively, is threaded through a hole 75 in one of the two twine tensioning members 60 of base mount 38 and through hollow link members 39, 40, 42, and 43, creates enough friction in the twine strands so that each twine strand 72a, 72b, 72c, and 72d experiences additional tension when the twine arms are in the cutting position. This additional twine tension facilitates the cutting of the twine strands by twine cutting mechanism 80. Twine cutting mechanism 80 includes shear bars 82 mounted to frame 11 and knife assemblies 84 disposed on a rotatable elongated bar 86 so that each twine strand is cut by one of the knife assemblies when it rotates to engage a respective one of the shear bars during a twine cutting operation.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

What is claimed is:

1. A round baler comprising:
   a housing;
   a bale chamber defined at least in part by walls of the housing and having an opening for receiving a cut crop material;
   a bale forming apparatus defining at least a portion of the bale chamber, configured to form a rotating bale of cut crop material in the chamber, and disposed inside the housing;
   a bale wrapping apparatus disposed near the bale chamber to wrap a rotating bale formed in the chamber, comprising:
      four twine supply rolls defining four twine strands;
      four twine dispensing tubes, wherein each dispensing tube presents a corresponding one of the four twine strands so that an end of each strand dangles from the corresponding tube, each tube being movable between (1) a home position and (2) a twine insert position, wherein each twine strand end dangles adjacent to a position of a bale rotating in the chamber when the four dispensing tubes are in the twine insert position; and
      two twine tensioning members disposed so that each twine tensioning member receives two of the four twine strands, wherein each twine tensioning member has a receiving portion through which the two strands are threaded, wherein each twine tensioning member is positioned to provide slack tension on the ends of the respective two strands when the four dispensing tubes are in the twine insert position, and wherein each twine tensioning member is positioned to increase wrapping tension on the respective two strands after the respective two strands have started to wrap the rotating bale.

2. A round baler as recited in claim 1, wherein each twine tensioning member has two holes formed therein to provide the receiving portion and wherein each hole receives threaded therethrough one of the respective two strands.

3. A round baler as recited in claim 1, wherein each twine dispensing tube is provided by a tube or a ring through which a respective one of the four strands is threaded therethrough.

4. A round baler as recited in claim 1, wherein each twine dispensing tube is movable along an arcuate path between the home position and the twine insert position.

5. A round baler as recited in claim 1, wherein the bale wrapping apparatus further comprises two arm members, each arm member being connected to a respective two of the four twine dispensing tubes.

6. A round baler as recited in claim 5, wherein each arm member includes two hollow portions through which a respective one of the four twine strands passes.

7. A round baler as recited in claim 5, wherein the bale wrapping apparatus further comprises a twine arm pivotally connected at one end to a cam member connected to each arm member and pivotally connected at the other end to a base mount.

8. A round baler as recited in claim 7, wherein each twine tensioning member is provided by a portion of the base mount.

9. A round baler as recited in claim 7, wherein each twine arm is provided by two link members, each link member being pivotally connected at one end to a respective cam member and pivotally connected at the other end to the base mount.

10. A round baler as recited in claim 9, wherein each link member has a hollow portion and one of the four twine strands is threaded through the hollow portion of each link member.

11. A round baler as recited in claim 1, wherein each twine dispensing tube is movable to a cutting position, and wherein each twine tensioning member provides additional tension to each of the respective two strands when the four twine dispensing tubes are in the cutting position.

12. A round baler according to claim 1, wherein the twine rolls are rotatingly connected to the housing.

13. A round baler according to claim 9, wherein the two twine arms connected to the base mount provide a parallel linkage that keeps respectively paired twine dispensing tubes evenly spaced and perpendicular to a bale axis as the twine arms move across a surface of the bale during a twine wrapping operation.

* * * * *